(12) United States Patent
Roers et al.

(10) Patent No.: US 8,980,422 B2
(45) Date of Patent: Mar. 17, 2015

(54) POLYURETHANE/POLYISOCYANURATE FOAM HAVING IMPROVED ADHESION PROPERTIES

(75) Inventors: Rolf Roers, Odenthal (DE); Torsten Heinemann, Leichlingen (DE); Maria Dolors Mateu, Tarragona (ES)

(73) Assignee: Bayer MaterialScience AG (DE)

( * ) Notice: Subject to any disclaimer, the term of this patent is extended or adjusted under 35 U.S.C. 154(b) by 0 days.

(21) Appl. No.: 13/508,998

(22) PCT Filed: Nov. 9, 2010

(86) PCT No.: PCT/EP2010/067088
§ 371 (c)(1),
(2), (4) Date: May 10, 2012

(87) PCT Pub. No.: WO2011/057999
PCT Pub. Date: May 19, 2011

(65) Prior Publication Data
US 2012/0225279 A1    Sep. 6, 2012

(30) Foreign Application Priority Data

Nov. 14, 2009 (EP) .................................... 09014257

(51) Int. Cl.
| | | |
|---|---|---|
| B32B 15/095 | (2006.01) | |
| B32B 5/20 | (2006.01) | |
| C09D 175/08 | (2006.01) | |
| C08G 18/18 | (2006.01) | |
| B32B 5/18 | (2006.01) | |
| B32B 15/08 | (2006.01) | |
| B32B 27/40 | (2006.01) | |
| C08G 18/09 | (2006.01) | |
| C08G 18/40 | (2006.01) | |
| C08G 18/42 | (2006.01) | |
| C08G 18/48 | (2006.01) | |
| C08J 9/14 | (2006.01) | |
| C08G 101/00 | (2006.01) | |

(52) U.S. Cl.
CPC .............. *C08G 18/1816* (2013.01); *B32B 5/18* (2013.01); *B32B 15/08* (2013.01); *B32B 27/40* (2013.01); *C08G 18/092* (2013.01); *C08G 18/4018* (2013.01); *C08G 18/4211* (2013.01); *C08G 18/4829* (2013.01); *C08G 18/4833* (2013.01); *C08J 9/141* (2013.01); *C08G 2101/005* (2013.01); *C08G 2105/02* (2013.01); *C08J 2375/06* (2013.01); *C08J 2375/08* (2013.01)
USPC ....................... 428/319.1; 428/304.4; 521/173

(58) Field of Classification Search
CPC ....... B32B 15/095; B32B 5/20; C09D 175/08
See application file for complete search history.

(56) References Cited

U.S. PATENT DOCUMENTS

| | | | | |
|---|---|---|---|---|
| 4,692,477 | A * | 9/1987 | Jacobina | ........................ 521/174 |
| 5,840,781 | A | 11/1998 | Dietrich et al. | |
| 2001/0025555 | A1* | 10/2001 | Sulzbach | ........................... 83/56 |
| 2002/0019452 | A1* | 2/2002 | Roels et al. | .................... 521/170 |
| 2011/0056431 | A1 | 3/2011 | Calgua et al. | |

FOREIGN PATENT DOCUMENTS

| | | |
|---|---|---|
| DE | 1247612 B | 8/1967 |
| DE | 1609668 A1 | 3/1972 |
| DE | 19502578 A1 | 8/1996 |
| EP | 0960723 A2 | 12/1999 |
| EP | 1167414 A1 | 1/2002 |
| EP | 1516720 A1 | 3/2005 |
| EP | 1577332 A1 | 9/2005 |
| GB | 1160891 A | 8/1969 |
| WO | WO-2006029786 A1 | 3/2006 |

OTHER PUBLICATIONS

International Search Report for PCT/EP2010/067088 mailed Jan. 12, 2011.

* cited by examiner

*Primary Examiner* — Randy Gulakowski
*Assistant Examiner* — Jeffrey Washville
(74) *Attorney, Agent, or Firm* — Drinker Biddle & Reath LLP

(57) ABSTRACT

A polyurethane/polyisocyanurate foam is obtainable from the reaction of A) a polyol component comprising A1) an aromatic polyester polyol, A2) a polyether polyol started on a carbohydrate polyol and A3) a polyether polyol started on ethylene glycol, wherein the total hydroxyl number of the polyol component A) is from ≥150 mg KOH/g to ≤300 mg KOH/g; with B) a polyisocyanate component, wherein the equivalent ratio of NCO groups to the sum of the hydrogen atoms reactive towards NCO groups is from ≥110:100 to ≤200:100. This foam has improved adhesion properties to facings and is suitable for the production of composite elements without requiring the use of an additional adhesion promoter.

21 Claims, No Drawings

POLYURETHANE/POLYISOCYANURATE FOAM HAVING IMPROVED ADHESION PROPERTIES

CROSS-REFERENCE TO RELATED APPLICATIONS

This application is a national stage application (under 35 U.S.C. §371) of PCT/EP2010/067088, filed Nov. 9, 2010, which claims benefit of European application 09014257.1, filed Nov. 14, 2009, both of which are incorporated herein by reference in their entirety for all their useful purposes.

BACKGROUND

The present invention relates to a polyurethane/polyisocyanurate foam having improved adhesion properties. It relates further to its use in the production of metal composite elements, to metal composite elements produced therewith, and to a process for the production of the metal composite elements.

Metal sandwich elements based on rigid polyurethane (PU) foams, that is to say both rigid polyurethane (PUR) and rigid polyisocyanurate (PIR) foams, play an important role in the construction of industrial buildings. In addition to the heat insulation and fire behaviour, the bond properties, in particular the adhesiveness at the foam/steel interface, play an important role. The adhesiveness of the metal facing to the PU foam is particularly important for the continuous manufacture of such elements.

The processing of PIR foams in particular is conventionally carried out with the addition of adhesion promoters, 2K polyurethane adhesion promoter systems especially having become established. The adhesiveness is in principle markedly improved by the use of such 2K adhesion promoter systems. For the manufacturer of the finished components, this means an improvement in the product in that the long-term risks of adhesion failure are massively reduced.

In this connection, EP 1 516 720 A1 discloses the use of a polyurethane adhesion promoter for improving the adhesion between the layers of a composite element containing a polyisocyanurate foam and facings, as well as the composite elements as such and a process for their production. The adhesion promoter used is a polyurethane-based adhesion promoter known from the prior art having a density of from 400 to 1200 g/l. This adhesion promoter is generally obtainable by reacting polyisocyanates with compounds having two isocyanate-reactive hydrogen atoms, the reaction ratio being so chosen that the ratio of the number of isocyanate groups to the number of isocyanate-reactive groups in the reaction mixture is from 0.8 to 1.8:1, preferably from 1 to 1.6:1. Preferred embodiments relate to the use of reactive 2K polyurethane adhesion promoter, which is still reactive when the foam layer and the facing are brought together. However, this involves a potential risk to users.

In general, the use of such adhesion promoters means additional costs for material and processing technologies. Moreover, difficulties with adequate homogenisation of the adhesion promoter components can occur in the processing of such 2K adhesion promoter systems. Insufficient homogenisation can represent a high risk in respect of the long-term bond properties of the metal composite elements. Failure of the adhesion of the facing to the foam can occur in the case of fluctuating temperatures. Furthermore, the processing of a 2K adhesion promoter system means relatively high rejections of chemical raw materials and steel sheets at the beginning of a production phase.

PIR foams which, on processing to metal composite elements, exhibit good adhesiveness in the foam/sheet metal composite even without being pretreated with adhesion promoter would therefore be desirable. In particular, a PIR foam which exhibits good adhesiveness in the continuous manufacture of metal composite elements even at comparatively low twin-belt conveyor temperatures would be desirable.

DESCRIPTION OF EMBODIMENTS

According to the invention there is therefore proposed a polyurethane/polyisocyanurate foam obtainable from the reaction of A) A Polyol Component Comprising
   A1) an aromatic polyester polyol,
   A2) a polyether polyol started on a carbohydrate polyol and
   A3) a polyether polyol started on ethylene glycol,
   wherein the total hydroxyl number of the polyol component A) is from ≥150 mg KOH/g to ≤300 mg KOH/g;
with
B) A Polyisocyanate Component,
wherein the equivalent ratio of NCO groups to the sum of the hydrogen atoms reactive towards NCO groups is from ≥110:100 to ≤200:100.

Foams according to the invention can be processed to composite elements without additional adhesion promoters, the adhesiveness that is achieved between the foam and the facing being satisfactory in practice. It is accordingly possible to obtain adhesiveness according to DIN 53292 above the widely relevant value of 0.2 N/mm$^2$.

The aromatic polyester polyol A1) can be, for example, a polycondensation product of di- as well as optionally tri- and tetra-ols and aromatic di- as well as optionally tri- and tetra-carboxylic acids or hydroxycarboxylic acids or lactones. Instead of the free polycarboxylic acids, the corresponding polycarboxylic acid anhydrides or corresponding polycarboxylic acid esters of lower alcohols can be used to prepare the polyesters.

Examples of suitable diols are ethylene glycol, butylene glycol, diethylene glycol, triethylene glycol, polyalkylene glycols such as polyethylene glycol, also 1,2-propanediol, 1,3-propanediol, 1,3-butanediol, 1,4-butanediol, 1,6-hexanediol and isomers, neopentyl glycol or hydroxypivalic acid neopentyl glycol ester, with 1,6-hexanediol and isomers, neopentyl glycol and hydroxypivalic acid neopentyl glycol ester being preferred. In addition, polyols such as trimethylolpropane, glycerol, erythritol, pentaerythritol, trimethylolbenzene or trishydroxyethyl isocyanurate can also be used.

As aromatic dicarboxylic acids there can be used, for example, phthalic acid, isophthalic acid, terephthalic acid and/or tetrachlorophthalic acid. The corresponding anhydrides can also be used as the acid source.

Provided that the mean functionality of the polyol to be esterified is 2, monocarboxylic acids such as benzoic acid and hexanecarboxylic acid can additionally also be used concomitantly.

Hydroxycarboxylic acids which can be used concomitantly as reactants in the preparation of an aromatic polyester polyol having terminal hydroxyl groups are, for example, hydroxycaproic acid, hydroxybutyric acid, hydroxydecanoic acid, hydroxystearic acid and the like. Suitable lactones are caprolactone, butyrolactone and homologues. Caprolactone is preferred.

The polyester polyol A1) can have an OH number (hydroxyl number) of from ≥200 mg KOH/g to ≤300 mg KOH/g and preferably from ≥220 mg KOH/g to ≤260 mg KOH/g.

Within the context of the present invention, described OH numbers can generally be determined on the basis of DIN 53240. The average functionality of this polyester polyol is advantageously from ≥1.8 to ≤2.2.

The polyether polyol A2) started on a carbohydrate polyol can be started, for example, on mannitol, isomaltose, lactitol, sorbitol, xylitol, threitol, erythritol and/or arabitol. "Started on a carbohydrate polyol" means that the corresponding polyol can be regarded as the starting point for a reaction with epoxides for polyether synthesis. Sorbitol is preferred. Polyether polyols which are suitable according to the invention include the addition products of styrene oxide, ethylene oxide, propylene oxide, butylene oxide and/or epichlorohydrin on such carbohydrate polyols. For influencing the functionality, further polyols such as butyl diglycol, glycerol, diethylene glycol, trimethylolpropane, propylene glycol and/or 1,4-butanediol can also be used in the polyether synthesis.

The polyether polyol A2) can have an OH number of from ≥400 mg KOH/g to ≤450 mg KOH/g and preferably from ≥420 mg KOH/g to ≤440 mg KOH/g. The average functionality of this polyether polyol is advantageously from ≥3.8 to ≤4.2.

The polyether polyol A3) started on ethylene glycol can be, for example, an addition product of styrene oxide, ethylene oxide, propylene oxide, butylene oxide and/or epichlorohydrin on ethylene glycol. This polyol can have an OH number of from ≥200 mg KOH/g to ≤300 mg KOH/g and preferably from ≥260 mg KOH/g to ≥390 mg KOH/g. The average functionality of this polyether polyol is advantageously from ≥1.8 to ≤2.2.

The polyisocyanate component B) comprises the polyisocyanates conventional in polyurethane chemistry. There come into consideration generally aliphatic, cycloaliphatic, arylaliphatic and aromatic polyvalent isocyanates. Aromatic di- and poly-isocyanates are preferably used. The polyisocyanate component preferably comprises monomeric and/or polymeric diphenylmethane diisocyanate. For example, this can be 2,2'-, 2,4'- and 4,4'-diphenylmethane diisocyanate (MDI) as well as arbitrary mixtures of these isomers, mixtures of 2,2'-, 2,4'-, 4,4'-diphenylmethane diisocyanates (dinuclear MDI) or polyphenylene-polymethylene polyisocyanates (polymeric MDI). It is possible for further polyisocyanates to be present in the polyisocyanate component B). Preferred examples are 2,4- and 2,6-toluene diisocyanate (TDI) as well as arbitrary mixtures of these isomers.

It is provided according to the invention that the total hydroxyl number of the polyol component A) is from ≥150 mg KOH/g to ≤300 mg KOH/g. The polyol component A) is to be understood as being the totality of the polyols used for the polyol formation. Water added as blowing agent, for example, is not included in this hydroxyl number. The total hydroxyl number can also be from ≥210 mg KOH/g to ≤290 mg KOH/g and preferably from ≥220 mg KOH/g to ≤270 mg KOH/g. It can be determined on the basis of DIN 53240.

It is further provided according to the invention that the equivalent ratio of NCO groups to the sum of the hydrogen atoms reactive towards NCO groups is from ≥110:100 to ≤200:100. This ratio or index can also be from ≥120:100 to ≤190:100 or from ≥150:100 to ≤170:100. Without being bound to one theory, it is assumed that, at such a comparatively low index for PIR foams, better adhesion of the foam to substrates occurs on processing of the polyol component A) according to the invention.

In the process according to the invention for the production of the PUR/PIR foam, conventional auxiliary substances and additives such as, for example, flame retardants, stabilisers, catalysts and blowing agents and the like can further be used.

There can be used as blowing agents generally known chemically or physically acting compounds. Water can preferably be used as a chemically acting blowing agent. Examples of physical blowing agents are (cyclo)aliphatic hydrocarbons having from 4 to 8 carbon atoms, as well as halogenated hydrocarbons, which evaporate under the conditions of the polyurethane formation. In a preferred embodiment, pentane and cyclopentane, as well as mixtures of pentane and cyclopentane, are used as blowing agent.

The amount of blowing agents used is governed primarily by the desired density of the foams. In general, water is used in an amount of from 0 wt. % to 5 wt. % (based on the total recipe), preferably from 0.1 wt. % to 3 wt. %. In general, physically acting blowing agent can further be used in an amount of from 0 wt. % to 8 wt. %, preferably from 0.1 wt. % to 5 wt. %. Carbon dioxide can also be used as blowing agent, which is preferably dissolved in gas form in the starting components.

There can be used as catalysts for the production of the PUR/PIR foams the conventional and known polyurethane- and polyisocyanurate-forming catalysts. Examples thereof are organic tin compounds such as tin diacetate, tin dioctoate, dibutyltin dilaurate and/or strongly basic amines such as 2,2, 2-diazabicyclooctane, triethylamine, dimethylcyclohexylamine, triethylenediamine or bis(N,N-dimethylaminoethyl) ether, as well as potassium acetate and aliphatic quaternary ammonium salts for catalysis of the PIR reaction.

The catalysts are preferably used in an amount of from 0.1 wt. % to 3 wt. %, preferably from 0.5 wt. % to 2 wt. %, based on the total weight of all components.

Examples of flame retardants are phosphates such as tris (1-chloro-2-propyl) phosphate (TCPP) and triethyl phosphate (TEP). Examples of stabilisers are silicone-containing foam stabilisers such as polyether-polysiloxane copolymers.

PUR/PIR foams obtained by the process according to the invention can have a density of, for example, from ≥20 g/l to ≤150 g/l. It can be determined on the basis of DIN EN ISO 3386-1-98.

An example of a recipe for the polyol component A) in the process according to the invention is:
  polyester polyol A1): from ≥30 to ≤50 parts by weight
  polyether polyol A2): from ≥10 to ≤30 parts by weight
  polyether polyol A3): from ≥5 to ≤15 parts by weight.
  There can further be added:
  flame retardant trichloroisopropyl phosphate: from ≥15 to ≤35 parts by weight silicone-containing stabiliser: from ≥1 to ≤5 parts by weight
  carboxylic acid salt (PIR catalyst): from ≥2 to ≤5 parts by weight amine catalyst: from ≥0.1 to ≤1 part by weight.

In an embodiment of the foam according to the invention, the aromatic polyester polyol A1) is obtainable from phthalic anhydride and diethylene glycol.

In a further embodiment of the foam according to the invention, the polyether polyol A2) started on sorbitol is obtainable from sorbitol, glycerol and propylene oxide.

In a further embodiment of the foam according to the invention, the polyether polyol A3) started on ethylene glycol is obtainable from ethylene glycol and ethylene oxide.

In a further embodiment of the foam according to the invention, the polyisocyanate component B) comprises a mixture of diphenylmethane-4,4'-diisocyanate with isomers and higher-functional homologues.

In a further embodiment of the foam according to the invention, in the polyol component A) components A1) and A2) are present in a weight ratio of from ≥1:1 to ≤3:1 and/or components A1) and A3) are present in a weight ratio of from ≥4:1 to ≤8:1 relative to one another and/or components A2)

and A3) are present in a weight ratio of from ≥2:1 to ≤4:1 relative to one another. Preferably, the weight ratios A1):A2): A3) are 39-41:19-21:6-8. With such weight ratios in particular, it has been found that particularly stable, reproducible processing is possible, the mechanical data, adhesiveness and panel geometries of composite elements meeting market requirements.

The present invention further provides a composite element comprising a facing and a layer comprising a polyurethane/polyisocyanurate foam according to the invention. The material of the facing can be, for example, metal, bitumen, paper, mineral nonwovens, nonwovens comprising organic fibres, plastics sheets, plastics foils and/or wooden sheets.

In particular, the adhesiveness between the facing and the foam layer in the foam composite element is from ≥0.12 N/mm$^2$ to ≤0.4 N/mm$^2$ The adhesiveness can be determined on the basis of standard DIN 53292. It can also be from ≥0.13 N/mm$^2$ to ≤0.37 N/mm$^2$ or from ≥0.20 N/mm$^2$ to ≤0.36 N/mm$^2$.

In an embodiment of the composite element, no adhesion promoter layer is arranged between the layer comprising a polyurethane/polyisocyanurate foam according to the invention and the facing. The advantage of the foam according to the invention, which exhibits improved adhesion properties, comes to bear here.

In a further embodiment of the composite element, the facing is a metal layer. Consequently, the composite element is a metal composite element. Such metal composite elements are preferably sandwich composite elements comprising at least two facings and an intermediate core layer of foam according to the invention. Suitable metals are, for example, steel and aluminium. Examples of the use of such metal composite elements are flat or lined wall elements as well as profiled roofing elements for industrial building and cold-storage depot construction as well as for lorry superstructures, building doors or transport containers.

The present invention relates further to a process for the production of composite elements, wherein a reaction mixture that yields the polyurethane/polyisocyanurate foam according to the invention is applied to a facing. The production of such composite elements can be carried out continuously or discontinuously. Devices for continuous production are known, for example, from DE 1 609 668 or DE 1 247 612.

In an embodiment of the process according to the invention, no adhesion promoter layer is arranged between the reaction mixture and facing. The advantage of the foam according to the invention, which exhibits improved adhesion properties, comes to bear here.

In a further embodiment of the process according to the invention, the facing is a metal layer. Suitable metals are, for example, steel and aluminium.

In a further embodiment of the process according to the invention, the process is in the form of a twin-belt conveyor process. Pretreatment of the facings can be omitted owing to the adhesive properties of the foam according to the invention. This simplifies the process and has immediate economic advantages.

In a further embodiment of the process according to the invention, the facing has a temperature of from ≥40° C. to ≤60° C. on application of the reaction mixture. This temperature can be achieved in the production plant, for example, by means of a preceding oven installation. For twin-belt conveyor systems in particular, the temperature is comparatively low, which again brings advantages in terms of process management and economy. The temperature can also be from ≥50° C. to ≤55° C.

The present invention relates likewise to the use of the foam according to the invention in the production of composite elements. In the use according to the invention, the composite element is preferably a metal composite element, yet more preferably a steel or aluminium composite element. The foam according to the invention can be used in particular in the production of composite elements in which there is no adhesion promoter layer between the facing and the foam.

The present invention is explained in detail by means of the following examples.

A PIR foam was obtained in a conventional procedure according to the recipe indicated below. The foam was applied directly to a metal facing, that is to say without an intermediate adhesion promoter layer.

Polyol Formulation:

A1) Polyester polyol of phthalic anhydride and diethylene glycol, functionality 2, OH number 240 mg KOH/g: 40 parts by weight A2) Polyether polyol of sorbitol, glycerol and propylene oxide, functionality 4, OH number 430 mg KOH/g: 20 parts by weight A3) Polyether polyol of ethylene glycol and ethylene oxide, functionality 2, OH number 280 mg KOH/g: 7 parts by weight Flame retardant trischloroisopropyl phosphate: 25 parts by weight Silicone-containing stabiliser: 2.5 parts by weight Dimethylcyclohexylamine: 0.3 part by weight Blowing agent 1: n-pentane Blowing agent 2: water Polyisocyanate: Desmodur® 44V20 (polymeric MDI, from Bayer MaterialScience AG)

Recipe:

Polyol formulation: 100 parts by weight

Desmorapid® 1792 (PIR catalyst, from Bayer MaterialScience AG): 3 parts by weight n-Pentane: 7 parts by weight Polyisocyanate: 177 parts by weight, corresponding to an index of 200

The Resulting Foam in a 40 mm Composite Element (Panel) had the Following Properties:

density: 40 kg/m$^3$; compressive strength: 0.15 N/mm$^2$ (DIN 53291); compressive modulus: 3.7 N/mm$^2$ (DIN 53291); tensile strength: 0.14 N/mm$^2$ (DIN 53292); tensile modulus: 4.7 N/mm$^2$ (DIN 53292).

The foam according to the invention was tested in respect of its adhesiveness in steel composite elements on the basis of DIN 53292. The procedure differed from the tensile test perpendicularly to the plane of the facing according to DIN 53292-82 by the different sample thickness and number of facings. In the test according to DIN 53292-82, the total thickness of the composite element is taken as the basis. The weakest region of the sample as a whole thereby determines the fracture site. By contrast, the adhesion test in the modification described here permits side-related assessment of the adhesion. A sample was therefore taken by cutting a composite element perpendicularly to the facings. Square samples having a side length of 50 mm and a height of 10 mm (including the facing) were used in the measurement. A tester was additionally adhesively bonded to the metal facings so that a standardised measurement of the adhesiveness could take place.

Blister formation after tempering at 105° C. for 1 hour was also tested.

The test results are given in Tables 1 and 2 below. The determined values σ H denote the adhesiveness values on the production top side and the production underside. The production underside is the side of a metal layer of a composite element to which the reaction mixture was applied. In the course of the further reaction, the expanding foam then reaches one side of the other metal layer. This is the production top side. The expressions "wall 40", "wall 80" and "wall 120" denote a wall thickness of the composite element of 40 mm, 80 mm and 120 mm, respectively.

TABLE 1

Test speed 5 mm/min, production underside

|  | Wall 40 | Wall 80 | Wall 120 |
|---|---|---|---|
| σ H [N/mm$^2$] | 0.36 | 0.354 | 0.49 |

TABLE 2

Test speed 5 mm/min, production top side

|  | Wall 40 | Wall 80 | Wall 120 |
|---|---|---|---|
| σ H [N/mm$^2$] | 0.205 | 0.253 | 0.118 |

The determined stress values G H exhibit values greater than 0.1 N/mm$^2$ throughout. Experience has shown that adhesiveness values above 0.1 N/mm$^2$ ensure adequate adhesion even in the case of long-term loading, that is to say over a period of several years with seasonal temperature cycles.

It was further observed that, in the system according to the invention, after storage of the foam composite element under warm conditions at 105° C. for 1 hour, the interface between the foam and the facing in the region of the bottom facing was free of blisters.

The invention claimed is:

1. A polyurethane/polyisocyanurate foam obtained from the reaction of
   A) a polyol component comprising
      A1) an aromatic polyester polyol,
      A2) a polyether polyol started on a carbohydrate polyol, and
      A3) a polyether polyol started on ethylene glycol,
      wherein the total hydroxyl number of the polyol component A) is from ≥150 mg KOH/g to ≤300 mg KOH/g;
   with
   B) a polyisocyanate component,
   wherein the equivalent ratio of NCO groups to the sum of the hydrogen atoms reactive towards NCO groups is from ≥110:100 to ≤200:100
   and components A1) and A3) are present in a weight ratio of from<=4:1 to<=8:1 relative to one another and
   wherein in the polyol component A), components A1) and A2) are present in a weight ratio of from ≥1:1 to ≤3:1 relative to one another and/or components A2) and A3) are present in a weight ratio of from ≥2:1 to ≤4:1 relative to one another.

2. The foam according to claim 1, wherein the aromatic polyester polyol A1) is obtained from phthalic anhydride and diethylene glycol.

3. The foam according to claim 1, wherein the polyether polyol A3) started on ethylene glycol is obtained from components comprising ethylene glycol and ethylene oxide.

4. The foam according to claim 1, wherein the polyisocyanate component B) comprises a mixture of diphenylmethane-4,4'-diisocyanate with isomers and higher-functional homologues.

5. A composite element comprising a facing and a layer comprising the polyurethane/polyisocyanurate foam according to claim 1.

6. The composite element according to claim 5, wherein no adhesion promoter layer is arranged between the layer comprising the polyurethane/polyisocyanurate foam and the facing.

7. The composite element according to claim 5, wherein the facing is a metal layer.

8. A process for the production of a composite element, comprising applying a reaction mixture that yields the polyurethane/polyisocyanurate foam according to claim 1 to a facing.

9. The process according to claim 8, wherein no adhesion promoter layer is arranged between the reaction mixture and the facing.

10. The process according to claim 8, wherein the facing is a metal layer.

11. The process according to claim 8, wherein the process is in the form of a twin-belt conveyor process.

12. The process according to claim 8, wherein the facing has a temperature of from≥40° C. to≤60° C. on application of the reaction mixture.

13. The foam according to claim 2, wherein the polyether polyol A3) started on ethylene glycol is obtained from components comprising ethylene glycol and ethylene oxide.

14. The foam according to claim 13, wherein the polyisocyanate component B) comprises a mixture of diphenylmethane-4,4'-diisocyanate with isomers and higher-functional homologues.

15. A composite element comprising a facing and a layer comprising the polyurethane/polyisocyanurate foam according to claim 14.

16. The process according to claim 8, wherein the facing has a temperature of from≥50° C. to≤55° C. on application of the reaction mixture.

17. The foam according to claim 14, wherein the total hydroxyl number of the polyol component A1) is from≥200 mg KOH/g to≤300 mg KOH/g, total hydroxyl number of the polyol component A2) is from≥400 mg KOH/g to≤450 mg KOH/g, and the total hydroxyl number of the polyol component A3) is from≥200 mg KOH/g to ≤300 mg KOH/g.

18. The foam according to claim 14, wherein the total hydroxyl number of the polyol component A1) is from≥220 mg KOH/g to≤260 mg KOH/g, total hydroxyl number of the polyol component A2) is from≥420 mg KOH/g to≤440 mg KOH/g, and the total hydroxyl number of the polyol component A3) is from≥260 mg KOH/g to≤300 mg KOH/g.

19. The foam according to claim 1, wherein the polyether polyol A2) started on a sorbitol and is obtained from components comprising sorbitol, glycerol and propylene oxide.

20. A polyurethane/polyisocyanurate foam obtained from the reaction of
   A) a polyol component comprising
      A1) an aromatic polyester polyol,
      A2) a polyether polyol started on a carbohydrate polyol, and
      A3) a polyether polyol started on ethylene glycol,
      wherein the total hydroxyl number of the polyol component A) is from≥150 mg KOH/g to≤300 mg KOH/g;
   with
   B) a polyisocyanate component,
   wherein the equivalent ratio of NCO groups to the sum of the hydrogen atoms reactive towards NCO groups is from≥110:100 to≤200:100 and components A1) and A3) are present in a weight ratio of from≥=4:1 to≤=8:1 relative to one another and the total hydroxyl number of the polyol component A1) is from≥200 mg KOH/g to≤300 mg KOH/g, total hydroxyl number of the polyol component A2) is from≥400 mg KOH/g to ≤450 mg KOH/g, and the total hydroxyl number of the polyol component A3) is from≥200 mg KOH/g to≤300 mg KOH/g.

21. The foam according to claim 20, wherein the total hydroxyl number of the polyol component A1) is from≥220 mg KOH/g to≤260 mg KOH/g, total hydroxyl number of the polyol component A2) is from≥420 mg KOH/g to≤440 mg KOH/g, and the total hydroxyl number of the polyol component A3) is from≥260 mg KOH/g to≤300 mg KOH/g.

* * * * *